United States Patent [19]

Bowling et al.

[11] Patent Number: 5,149,295
[45] Date of Patent: Sep. 22, 1992

[54] METHOD FOR DE-HAIRING ANIMALS

[75] Inventors: Rod A. Bowling, Fort Collins; Robert P. Clayton, Kersey, both of Colo.

[73] Assignee: Monfort Inc., Greeley, Colo.

[21] Appl. No.: 604,064

[22] Filed: Oct. 26, 1990

[51] Int. Cl.$^5$ ................................................ A22B 5/08
[52] U.S. Cl. ........................................ 452/71; 8/94.18
[58] Field of Search ............... 452/81, 71, 84, 73; 435/265, 839; 8/94.18, 94.22, 94.23

[56] References Cited

U.S. PATENT DOCUMENTS

| | | | |
|---|---|---|---|
| 3,808,637 | 5/1974 | Lapidus | 452/71 |
| 3,915,889 | 10/1975 | Jurd et al. | 252/404 |
| 4,309,795 | 1/1982 | Simonsen | 452/94 |
| 4,478,728 | 10/1984 | Hopkins et al. | 8/94.18 |
| 4,512,058 | 4/1985 | Abele | 452/73 |
| 4,581,148 | 4/1986 | Swanson et al. | 8/94.18 |
| 4,674,152 | 6/1987 | Georges | 452/73 |
| 4,852,216 | 8/1989 | Clayton et al. | 452/81 |
| 4,862,557 | 9/1989 | Clayton et al. | 452/81 |

OTHER PUBLICATIONS

"Trade Practices for Proper Packer Cattlehide Delivery", (Leather Industries of America, Inc., Apr., 1990, pp. 1-27).
"Opportunities to Enhance Cattle By-Product Values", (The Cattlemen's Beef Promotion and Research Board, May, 1989).
Heidemann, et al., "Eine neue Konzeption der Rohhautaufbereitung", (Das Leder, 1977, vol. 28, pp. 138-149).
Heidemann, et al., "Fachzeitschrift für doe Chemle und Technologie der Lederherstellung Mitteilungsblatt des Vereins für Gerberel-Chemie und-Tecknik E. V., (Das Leder", 1977, vol. 28, pp. 81-89.
O'Brien et al., "Continuous Automatic Beamhouse Processing III. Effects of Processing Conditions of the Rapid Soaking and Unhairing of Cattlehides", JALCA, 1984, vol. 79, pp. 370-380).
Cranston et al., "Further Report on the New Csiro Unhairing Process", (CSIRO Division of Protein Chemistry, Parkville 3052, pp. 1-11).
Sagala et al., "RiöBenherstellung und Konservierung im Darmstädter Kurzzeitverfahren und Weiterverarbeitung der so hergestellten Blössen," Das Leder, 1977, vol. 28, pp. 166-169).
Komanowsky et al., "Continuous Automatic Beamhouse Processing II. Adaptation of Chemical Operations to the requirements of the Process", (JALCA, 1983, vol. 78, pp. 300-315).

*Primary Examiner*—Willis Little
*Attorney, Agent, or Firm*—Sheridan, Ross & McIntosh

[57] ABSTRACT

A method for remvoing hair from the hide of an animal to be slaughtered in order to reduce bacterial contamination of meat and meat by-products.

A bovine is first immobilized and a depilatory substance of sodium sulfide is sprayed onto the animal's hide for 1-60 seconds. After a dwell time of about 1-180 seconds, the hair contacted by the depilatory substance is removed by directing pressurized jets of water at the animal's hide. Neutralizing agents are then sprayed onto the animal to stop the depilatory process and the animal is conveyed to an exsanguination station for further processing.

40 Claims, No Drawings

METHOD FOR DE-HAIRING ANIMALS

FIELD OF THE INVENTION

This invention relates to the removal of hair from animals prior to slaughtering of such animals in order to reduce bacterial contamination of meat and meat by-products.

BACKGROUND OF THE INVENTION

In the meat industry, and particularly in those areas devoted to the processing of beef and pork, meat packers slaughter animals in a process in which the animals are stunned, bled, skinned, eviscerated, and fabricated into meat sections which are marketable to the public or the restaurant trade Animals enter a meat slaughter plant with various foreign materials present on their hair, including blood, dirt, manure, mud and vegetative material An animal's hair is also contaminated with a multitude of microorganisms, some of which are pathenogenic to humans. Most bacteria present in a meat slaughter and processing facility are carried into the facility on the hides of animals to be slaughtered. During the slaughtering process, these microorganisms contact meat and other meat by-products, thereby contaminating such products, creating handling problems and reducing the shelflife and safety of meat products.

The control of contamination by microorganisms is a recognized problem in the meat packing industry. Many techniques have been employed in the past in an effort to destroy surface bacterial flora on meat. For example, U.S. Pat. No. 4,852,216 to Clayton discloses a disinfection system using acetic acid spray in order to reduce bacteria levels and thereby increase shelf life of meat products Other inventors have utilized anti-microbial agents for preserving products normally subject to microbial spoilage. For example, U.S. Pat. No. 3,915,889 to Jurd discloses a certain anti-microbial agent that can be applied for preservation of a wide variety of substances including meat by-products.

Still other inventors have recognized the advantages of de-hairing animals to facilitate the slaughtering process. U.S. Pat. No. 4,674,152 to Georges discloses an apparatus and method for slaughtering animals by bleeding an animal, electrostatically charging the animal's hair, applying a combustible fluid to the hair and subsequently igniting the combustible fluid to burn the hair from the animal's body. U.S. Pat. No. 4,309,795 to Simonsen discloses a method and apparatus for de-hairing hogs wherein the hog is bled, its skin is scalded with hot water and then subjected to abrasive treatment to remove the hog's hair.

In the meat packing industry, many types of bacteria are known to cause food poisoning including *E. Coli,* Salmonella, *F. Coliforms,* Listeria, Staphylococcus, *F. Streptococcus,* Bacillus Anthraces, Balantidium Coli, Campylobacter Coli, Campylobacter *Jejune, Francisella Tularensis,* Sarcocystis, *Taenia Saginata,* Taenia Solium, Toxoplasma Gondil, Trichinella Spiralis, Yersinia Enterocolinea, Yersinia Pseudotuberculosis, Brucella, Chlamydia Petechia, Leptospira and Clostridium. These pathogenic bacteria develop under different conditions, all of which may be present in a meat processing facility. For example, Listeria is generally found in cool, damp environments such as coolers and meat processing areas. Staphylococcus is often found on cattle hair, in fecal material and in infected cuts and internal abscesses, and is sometimes associated with poor hygienic practices of food handlers. Psychotropic bacteria, such as Pseudomonades and Lactobacillus, are spoilage organisms affecting the shelf life of meat products, causing gas production, discoloration of meat and undesired odors. Coliform bacteria are typically found in soil, ingesta, and fecal material. Conventional post-slaughtering handling methods cannot adequately control or eliminate bacterial proliferation on meat products which are contaminated during slaughtering. In particular, refrigeration of meat during transportation and storage is not totally effective in preventing growth of pathogenic and spoilage bacterial flora. The bacteria present on an animals hide are known to grow in three temperature ranges: psychophiles grow from 30 degrees to 65 degrees Fahrenheit, mesophiles grow from 60 degrees to 120 degrees Fahrenheit, and thermophiles grow in temperatures in excess of 100 degrees Fahrenheit.

In view of the above, a need exists for a new method for reducing bacterial contamination of meat and meat by-products from the outset of the slaughtering process, prior to the exsanguination of the animal. The present invention addresses this need by providing a method for reducing bacterial contamination of meat by removing the vast majority of bacteria at the beginning of the slaughtering process by removal of an animal's hair.

SUMMARY OF THE INVENTION

The present invention includes a method for reducing bacterial contamination of meat during the slaughtering of an animal. In the method, a depilatory substance is applied to an animal and the animal's hair is then removed prior to further processing of the animal.

The depilatory substance, in one embodiment, is more specifically characterized as a chemical able to cleave disulfide bonds between cystine amino acid residues present in animal hair. Such depilatory substances are exemplified by the group comprising sodium sulfide or thioglycolic acid in combination with calcium oxide. Depilatory substances may also act by oxidizing the chemical bonds within a hair fiber. Such oxidizing depilatory substances are exemplified by strong caustic agents in the presence of peroxide, for example, sodium hydroxide in a composition with hydrogen peroxide.

A further embodiment of the process includes applying certain depilatory substances to an animal at a temperature of between about 100 degrees Fahrenheit and about 190 degrees Fahrenheit. A neutralizing agent can be applied to the animal after the depilatory substance has effectively cleaved disulfide bonds. In alternative embodiments, the animal is immobilized by impairing the animal's cerebellum and the animal's hair is removed by directing pressurized water or air at the animal.

DETAILED DESCRIPTION OF THE INVENTION

The present invention reduces microbial contamination of meat and meat by-products by removing the hair of an animal before the disassembly of the animal during slaughtering, thereby substantially eliminating all foreign matter, including dirt, manure, blood, ingesta and most importantly, microorganisms, associated with animal hair. The present invention recognizes the significant advantages achieved by eliminating the opportunity for microbial contamination from the very beginning of the meat processing procedure.

By practicing the present invention, the slaughtering process is initiated with animal carcasses essentially free of foreign matter and microorganisms. Using conventional procedures, animals enter the slaughtering process in a highly contaminated state and are processed in a manner that permits significant meat contamination to occur. In contrast, the present invention drastically reduces the number of microorganisms from the onset of the slaughtering process, and increases the effectiveness of subsequent measures taken in the meat processing procedure to control the growth of spoilage and pathogenic microorganisms. As used herein, the term microorganism refers to any microorganisms capable of contaminating meat products, thereby making such meat unsuitable or unhealthy for human or animal consumption. Such microorganisms include, but are not limited to, E. Coli, Salmonella, *F. Coliforms,* Listeria, Staphylococcus, *F. Streptococcus,* Bacillus Anthraces, Balantidium Coli, Campylobacter Coli, Campylobacter Jejune, *Francisella Tularensis,* Sarcocystis, *Taenia Saginata, Taenia Solium,* Toxoplasma Gondil, Trichinella Spiralis, Yersinia Enterocolinea, Yersinia Pseudotuberculosis, Brucella, *Chlamydia Petechia,* Leptospira and Clostridium.

The present invention further includes the use of the above-described de-hairing process in conjunction with subsequent microorganism control procedures, as well as such subsequent control procedures independently. Such subsequent control procedures include the use of intentional infection of meat with bacteria which are not pathogenic to humans and which do not otherwise make meat products unsuitable for sale and consumption by humans. The infection of meat with such bacteria competitively inhibits the growth of pathogenic microorganisms and microorganisms known to spoil or otherwise contaminate meat. Another such procedure is the evacuation of oxygen during meat packing to slow the growth of aerobic bacteria and thereby control undesired bacterial growth. Alternatively, infusion of other gases, such as carbon monoxide and carbon dioxide, can be used to inhibit anaerobic and aerobic bacterial growth on meat during the meat packing process to further reduce the likelihood of spoilage bacterial growth on meat and meat by-products.

As used herein, the term "animal" refers to any mammal of the kingdom Animalia which is consumed by humans or animals, including without limitation, bovine, ovine and porcine, and the term "hide" refers to the integument of an animal, such as a bovine hide, a porcine skin and an ovine pelt. The primary function of an animal hide while the animal is alive is to both form a protective barrier to actively prevent the penetration of material through the animal's hair. Microorganisms are unable to penetrate an intact living animal hide but can begin to enter the hide immediately upon the death of the animal. For four to eight minutes after an animal is immobilized, its skin continues acting as an active barrier to microorganisms.

In a meat processing facility, the opportunity for microbial contamination of meat and meat by-products first presents itself upon the cutting open of an animal, exposing the animal's interior to microorganisms present in the ambient environment. The risk of microbial contamination extends throughout the entire slaughtering process, including final fabrication of the animal into various sections of meat for commercial sale. Typically, an animal to be slaughtered is conveyed from an immobilization station directly to a bleeding station. Bleeding of the animal is usually accomplished by severing the animal's carotid artery using a sharp knife. The animal is thus killed by exsanguination. The severe wound made to the animal during the bleeding step allows microorganisms present on the animal's hide to enter the interior of the animal's body, thereby causing undesired bacterial contamination of meat and meat by-products to occur as well as infecting lost blood, thereby contaminating the general environment.

The present invention broadly involves the reduction of bacterial infection of meat during slaughtering by contacting a depilatory substance to an animal and subsequently removing the hair of the animal. Additionally, the invention can include immobilizing the animal to be slaughtered prior to contacting the animal with a depilatory substance.

The step of contacting or applying the depilatory substance to an animal can involve any method which sufficiently contacts a depilatory substance to an animal to allow the depilatory substance to react with the animal's hair. Such methods may include, but are not limited to, immersing, spraying, showering or dousing of the animal, or any other means known in the art for applying similar substances to an animal or animal hide.

In another embodiment, a depilatory substance is left to dwell on the animal hide until the hair is cleaved a small distance below the surface of the hide and the upper epidermis is removed. In an embodiment using sodium sulfide as the depilatory substance, the depilatory substance is sprayed onto the animal's hide for 1–60 seconds and left to dwell for an additional 1–180 seconds.

Under some situations, such as when animals are caked with mud and other foreign matter, or when it is desirable to reduce depilatory substance application time, the step of contacting may further include physical agitation of an animal's hair and hide. Physical agitation may include any means known in the art including brushes, or application of depilatory substances with pressurized sprays. In one particular embodiment, brushes positioned on each side of the animal can be used to loosen hair on an animal's hide, thereby assisting in the removal of hair and affording better contact between the animal's hair and the depilatory substance.

The depilatory substance of the present invention is any chemical compound known to depilate hair from an animal's hide. While not intending to be bound by theory, it is believed that depilatory substances remove hair by breaking chemical bonds within individual hair fibers. Animal hair, and specifically cattle hair, is composed primarily of a single structural protein, keratin. Individual keratin molecules are held together to form hair fibers by covalent disulfide bridges between cystine amino acid residues. These bonds are easily broken by reducing chemicals. Under strong reducing conditions, most of the disulfide bonds in a hair fiber will be broken and the hair will be cleaved into pieces less than a few millimeters in length. Other depilatory substances, such as strong caustic agents, act by oxidizing chemical bonds within hair fibers. An example of such caustic agents is a solution comprising sodium hydroxide, further described below. Therefore, according to this theory, the depilatory substances used in the present invention dissolve certain portions of an animal's hair and permit removal of the hair from the animal's hide. Moreover, upon contacting of a depilatory substance to an animal's hide, many microorganisms are initially killed by the strong reducing and oxidizing agents utilized.

Preferably, the depilatory substance of the present invention can be sodium sulfide; a composition of thioglycolic acid, sodium hydroxide and calcium oxide; or sodium hydroxide and hydrogen peroxide. Care should be taken to use the various depilatory substances in amounts, concentrations and contact times which do not damage the animal hide. When the depilatory substance comprises sodium sulfide, sodium sulfide is in a concentration from about 5% to about 15%, more preferably from about 8% to about 13%, and most preferably from about 9% to about 12%.

In the embodiment of the invention in which the depilatory substance comprises sodium hydroxide and hydrogen peroxide, NaOH is present in a concentration of about 10% to about 20%, more preferably about 12% to about 17%, and most preferably about 13% to about 15%. In this embodiment, hydrogen peroxide is present in a concentration of about 1% to about 10%, more preferably about 2% to about 8% and most preferably about 4% to about 6%.

In another embodiment of the invention, the depilatory substance comprises about 5% to about 15% thioglycolic acid, about 1% to about 5% calcium oxide and about 1% to about 5% sodium hydroxide. It is more preferable in the above embodiment to have thioglycolic acid in a concentration of about 7% to about 12%, and most preferably in a concentration of about 8% to about 11%.

In addition to the foregoing specific formulations, other chemicals recognized in the art as effective to remove or dissolve hair from the hide of an animal, can be used as well.

It has been recognized that certain depilatory substances work more effectively when heated, specifically, the above described depilatory substance comprising sodium hydroxide and hydrogen peroxide and those comprising thioglycolic acid, calcium oxide and sodium hydroxide. It is preferable to heat the respective depilatory substances to a temperature between about 100 degree Fahrenheit and about 190 degrees Fahrenheit, more preferably to between about 160 degrees Fahrenheit and about 185 degrees Fahrenheit, and most preferably between about 175 degrees Fahrenheit and about 180 degrees Fahrenheit. The dwell time of any particular depilatory substance contacted with an animal's hide will vary depending upon the particular animal species, the type and concentration of depilatory substances used and the temperature at which such depilatory substances are applied, as well as other factors. In a preferred embodiment using sodium sulfide, the depilatory substance is effective at room temperature.

One embodiment of the invention further includes contacting a surfactant or wetting agent to the animal either prior to or in conjunction with the depilatory substance. Surfactants and wetting agents are known to break the surface tension of water, thus allowing for increased saturation of chemicals applied subsequent to or in conjunction with such surfactants and wetting agents. The surfactant or wetting agent of the present invention can be any composition known to those skilled in the art suitable for increasing penetration of depilatory substances on the hair of an animal.

More particularly, surfactant or wetting agents include soaps, alcohols, fatty acids or detergents, preferably sodium salts of fatty acids, and most preferably sodium lauryl sulfate. The amount of surfactant used in a particular application depends on the strength of the depilatory substance used, the condition of an animal's hair and the amount of depilatory substance contact time, among other factors. Typically, the surfactant, when applied in connection with the depilatory substance, is applied in amounts by volume percent of depilatory substance of between about 3.0% and about 0.1%, more preferably between about 2% and about 0.3%, and most preferably between about 0.7% and about 0.4%.

In an alternative embodiment of the invention, a neutralizing substance is applied to an animal subsequent to contacting a depilatory substance to the animal. The neutralizing substance is provided to cease the particular chemical action of the depilatory substance. Use of a particular neutralizing substance depends upon the depilatory substance being used. For example, in one embodiment of the present invention, the depilatory substance sodium sulfide is neutralized by application of sodium bicarbonate or sodium carbonate in combination with hydrogen or sodium peroxide In this embodiment, about 5% to about 15% sodium sulfide is applied to the animal's hide and left to dwell for about 1 to about 180 seconds before removal of the animal's hair. After removal of the hair, a solution containing about 5% to about 15% sodium bicarbonate and about 1% to about 5% peroxide is sprayed onto the animal's hide and left to dwell on the hide for about 1 to about 60 seconds to allow for the oxidation of sulfide ions Additional peroxide applications may be used for complete oxidation of any remaining sulfides. Such additional applications of peroxide may be followed by additional carbonate and sodium bicarbonate washings to further adjust pH levels.

In another embodiment of the present invention using a combination of sodium hydroxide and peroxide as the depilatory substance, an oxidating agent such as an organic acid, for example, acetic acid, propionic acid, lactic acid or citric acid, is used to cease the depilatory action of the depilatory substance. When a composition of thioglycolic acid, sodium hydroxide and calcium oxide is used as the depilatory substance, hydrogen peroxide is used as the neutralizing substance. The amount of neutralizing substance used in a particular case depends upon the amount and type of depilatory substance used, the time constraints on the de-hairing process, as well as other factors.

The step of removing hair in the present invention can be accomplished in any manner which substantially eliminates the majority of hair on the animal. The de-hairing of animals is performed relatively quickly to facilitate the timely conveyance of such animals along a meat processing line. In a preferred embodiment, hair is removed from an animal by directing pressurized water at the animal. The pressurized jets of water effectively strip the loosened hair from the animal's hide without damaging the hide. Other embodiments of the present invention include means for removal of hair using mechanical devices such as rigid blades, brushes or combs. Pressurized air sprays can also be effective in removing hair from the animal, especially in conjunction with the use of pressurized water sprays. The removal of the hair and microorganisms associated with such hair, achieves the objective of reducing microbial contamination of meat and meat by-products during the remainder of the slaughtering process.

The step of immobilizing an animal is preferably performed prior to the application of a depilatory substance to the animal's hide. Immobilization includes any means for precluding movement of the animal. A specific embodiment of the invention includes immobilizing an animal by impairing the animal's cerebellum. Impairment of an animal's cerebellum can, for example, be accomplished by using a stun gun device, which sends a bolt through the animal's skull, thereby impairing its cerebellum and causing all voluntary muscle movements to cease. Alternatively, animals may be immobilized by having them breathe immobilizing gases, by applying an electrical charge to an animal's head or spine, injecting an animal with immobilizing drugs or by striking an animal with a heavy instrument. Preferably, injury to an animal's medulla oblongata is to be avoided to preclude cessation of the animal's involuntary muscle reactions, specifically the functioning of the animal's heart. In this manner, during the bleeding of an animal, which is typically accomplished by severing the animal's carotid artery, it is preferable to have the animal's heart pumping so as to assist in the evacuation of blood from the animal's body.

The additional step of dispatching of an animal is preferably performed subsequent to the step of removing hair from an animal. The term "dispatch" as used herein refers to the killing of the animal and is typically accomplished by exsanguination of the animal through the severing of the animal's carotid artery while the animal is immobilized and suspended from a conveyor line.

Among the other advantages of the present invention, the removal of animal hair prior to the bleeding of the animal allows for the collection of blood significantly less contaminated by microorganisms than blood collected in traditional meat packing facilities. This relatively microorganism-free blood may be collected and further processed for use as feed supplements or used for extraction of pharmaceutical substances contained in the blood.

The sludge by-product produced by the de-hairing process can also be collected along with depilatory substances, surfactants, neutralizing substances, and various foreign matter found in the hair. Recovery and recycling of various components of the sludge by-product may be desirable. For example, the sludge mixture can be further processed in order to regenerate usable depilatory substance, such as by chemically altering the products produced by the reaction between the depilatory substance and the neutralizing substance. In one embodiment of the invention, a sludge mixture, comprised of hair removed from an animal mixed with a sodium sulfide depilatory solution, may be reacted with sulfuric acid to produce hydrogen sulfide (gas). The resulting hydrogen sulfide is reacted with sodium hydroxide to regenerate the sodium sulfide depilatory substance and small quantities of sodium sulfate.

Hair recovered and separated from the sludge can be further processed for use as animal feed and for composing of fertilizer precursors, as well as other uses including recovery of specific amino acids.

When using depilatory substances, particularly those including sodium sulfide, thioglycolic acid or sodium hydroxide as components, it is advisable to use special precautions including the wearing of neoprene gloves, chemical splash goggles, rubber shoes and neoprene aprons. Inert absorbent substances such as sand, earth or vermiculite can be utilized for the clean up of these depilatory substances. Additionally, especially when sodium sulfide is the depilatory substance, care must be taken to keep the pH level of the depilatory substance relatively high (9.5-12) so as to avoid excessive production of hydrogen sulfide gas which is deadly poisonous. Adequate ventilation should be provided to quickly evacuate any hydrogen sulfide gas produced.

The present invention further includes a method for preparing hides for tanning. An industry intimately connected with the slaughter industry is the tanning industry. Current slaughtering methods largely dictate present tanning processes. Among the advantages of the present invention include benefits achieved by reducing the steps and costs of hide tanning procedures. Animal hides, especially cattle hides, are one of the most valuable by-products of the cattle slaughtering process. Traditionally, an animal's hair has been removed from its hide only once the hide has been removed from the animal and fleshed. The hide tanning industry, rather than the meat processor, has traditionally utilized chemical compositions to depilate animal hides in preparation for subsequent treatment of such hides in the production of various leather goods. Traditional methods of slaughtering, however, damage a significant percentage of hides, making such hides less valuable to tanneries and precluding the use of such hides for marketable leather items.

Pursuant to conventional practices, a hide is removed from an animal with its hair intact. The hide is then put through a fleshing machine which removes fatty tissue from the non-haired hide surface. The resulting hide is then cured, for example by salting the hide, and shipped to a tanner. Significant quantities of manure, hair, water and salt are transported with the hair on the hides. The tanner then removes the hair present on the hide for further leather processing. The disadvantages of the above-described conventional procedure is that many hides are damaged during the fleshing process. There also are significant costs incurred by the tanner to de-salt the hides. Moreover, grading of the hides before removal of hair from the hides is a difficult task.

One embodiment of the present invention provides a method for preparing hides by applying a depilatory substance to an animal prior to fleshing of the animal's hide, and subsequently removing hair contacted by the depilatory substance. By removing hair from the animal prior to fleshing of the hide, significant advantages are achieved. A series of machines are used to pull the hides from animal carcasses. Mud, manure and wet hair cause the gripping device of the hide pullers to slip which may stretch, tear or scar the hide. Moreover, a serious problem in hide preparation is that the machines utilized to clean, flesh and cure the hides often cause physical damage to the hides. Manure and mud balls attached to an animal's hair creates an uneven thickness which can cause tears or cuts in the hide when the hide is pressed between rollers and blades used in the fleshing process. Others have tried various methods to remove the mud and manure balls that form on cattle hides with little success. The present invention, by removing the hair from the animal's hide, effectively removes such manure and mud balls, thereby eliminating the ripping and tearing problems associated with traditional methods of hide processing. Damage caused to fleshing machines and hide pullers as a result of such manure and mud balls is also reduced.

Moreover, removal of bacteria from hides by the de-hairing method of the present invention, reduces the proteolytic degradation of such hides.

The tanning industry prefers cattle hides with no brands burned into the animal hide or scratches caused by horns, barbed wire or the slaughtering process itself. Ranchers unfortunately continue the practice of branding their cattle for identification purposes and the use of barbed wire is widespread. Meat processing facilities attempt to sort through cattle hides to separate branded and scratched hides from non-branded and non-scratched hides, the latter being separately shipped to tanners to be processed into high quality leather. It is often impossible to discern whether a hide has been damaged with animal hair present on the hide. Thus, one benefit of the present invention is to remove hair from animal hides, facilitating the sorting and grading of hides and reducing misshipments of damaged hides by meat processors to tanneries.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. In a method for slaughtering an animal, wherein said animal is immobilized, dispatched, and fabricated, the improvement comprising the steps of:
   a. contacting a depilatory substance to said animal's hair prior to dispatching said animal; and
   b. removing said hair contacted by said depilatory substance.

2. A method as set forth in claim 1 wherein said removing comprises directing pressurized water at said animal.

3. A method as set forth in claim 1, wherein said animal comprises bovine, ovine or porcine.

4. A method as set forth in claim 1, wherein said step of immobilizing comprises impairing said animal's cerebellum.

5. The method as set forth in claim 1, wherein the depilatory substance cleaves bonds in said hair.

6. A method as set forth in claim 5, wherein said depilatory substance comprises sodium sulfide; a composition of sodium hydroxide, calcium oxide and thioglycolic acid; or a composition of sodium hydroxide and hydrogen peroxide.

7. A method as set forth in claim 1, wherein said depilatory substance comprises sodium sulfide in a concentration from about 5% to about 15%.

8. The method as set forth in claim 1, wherein said depilatory substance is between about 100° and about 190° Fahrenheit.

9. The method as set forth in claim 1, further comprising applying a neutralizing agent to said animal after applying said depilatory substance.

10. In a method of slaughtering an animal by immobilizing an animal, dispatching said animal and removing the hide of said animal, the improvement comprising the step of removing hair on said animal's hide with a depilatory substance prior to said dispatching of said animal to reduce bacterial contamination of meat during the slaughtering process.

11. A method as set forth in claim 10, wherein said animal comprises bovine, ovine or porcine.

12. A method as set forth in claim 10 wherein said step of removing comprises contacting a depilatory substance to said animal's hide.

13. A method as set forth in claim 12, wherein the depilatory substance cleaves bonds in said animal's hair.

14. A method for reducing bacterial contamination of meat during slaughtering, comprising:
   a. immobilizing an animal;
   b. applying a depilatory substance to said animal's hair;
   c. removing the hair on said animal's hide; and
   d. dispatching said animal from which hair has been removed.

15. A method as set forth in claim 14, wherein said animal comprises bovine, ovine or porcine.

16. The method as set forth in claim 14, wherein said step of immobilizing comprises impairing said animal's cerebellum.

17. The method as set forth in claim 14, wherein the depilatory substance reduces disulfide bonds between cystine residues in said animal hair.

18. The method as set forth in claim 14, wherein said depilatory substance comprises sodium sulfide; a composition of sodium hydroxide, calcium oxide and thioglycolic acid; or a composition of sodium hydroxide and hydrogen peroxide.

19. The method as set forth in claim 14, wherein said depilatory substance comprises sodium sulfide in a concentration from about 5% to about 15%.

20. The method as set forth in claim 14, wherein said depilatory substance comprises about 10% to about 20% sodium hydroxide in solutions with about 1% to about 7% hydrogen peroxide.

21. The method as set forth in claim 14, wherein said depilatory substance is between about 100° and about 190° Fahrenheit.

22. The method as set forth in claim 14, further comprising the step of recovering said depilatory substance.

23. The method as set forth in claim 14, wherein said depilatory substance comprises from about 5% to about 15% thioglycolic acid, about 1% to about 5% calcium oxide, and about 1% to about 5% sodium hydroxide.

24. The method as set forth in claim 14, wherein said depilatory substance is between about 100° Fahrenheit and about 190° Fahrenheit.

25. The method as set forth in claim 14, wherein said step of removing comprises directing pressurized stream of water or air at said animal.

26. The method as set forth in claim 14, further comprising applying a neutralizing agent to said animal after applying said depilatory substance.

27. The method as set forth in claim 19, wherein said neutralizing agent comprises sodium carbonate or sodium bicarbonate in combination with peroxide.

28. The method as set forth in claim 20, further comprising applying an oxidating agent to said animal hide after said step of contacting said depilatory substance wherein said oxidizing agent comprises acetic acid.

29. The method as set forth in claim 14, further comprising the step of applying a surfactant to said animal.

30. The method as set forth in claim 29, wherein said surfactant comprises a sodium salt of a fatty acid.

31. The method as set forth in claim 14, wherein the step of applying a depilatory substance further comprises agitation of said animal's hair.

32. A method as set forth in claim 14, further comprising the recovery of animal hair for further processing into animal feed or fertilizer.

33. A method for reducing microbial contact during slaughtering of an animal, comprising:
(a) immobilizing an animal;
(b) contacting a depilatory substance to said animal's hair;
(c) permitting said depilatory substance to reduce disulfide bonds between cystine residues of said hair;
(d) removing hair contacted by said depilatory substance by directing pressurized water or air at said animal's hide; and
(e) dispatching said animal from which hair has been removed.

34. A method for preparing hides, comprising:
(a) applying a depilatory substance to an animal's hair prior to fleshing of said animal's hide wherein said depilatory substance comprises sodium sulfide; a composition of sodium hydroxide, calcium oxide and thioglycolic acid; or a composition of sodium hydroxide and hydrogen peroxide; and
(b) removing hair contacted by said depilatory substance.

35. The method as set forth in claim 34, wherein said removing comprises directing pressurized streams of water or air at said animal's hide.

36. The method as set forth in claim 34, further comprising applying a neutralizing agent to said animal's hide after applying said depilatory substance.

37. A method as set forth in claim 34, wherein said depilatory substance comprises from about 5 percent to about 15 percent sodium sulfide.

38. A method as set forth in claim 34, wherein said depilatory substance comprises from abut 10 percent to about 120 percent sodium hydroxide and from about 1 percent to about 10 percent hydrogen peroxide.

39. A method as set forth in claim 34, wherein said depilatory substance comprises from about 5 percent to about 15 percent thioglycolic acid, from about 1 percent to about 5 percent calcium oxide and from about 1 percent to about 5 percent sodium hydroxide.

40. A method as set forth in claim 34, wherein said depilatory substance is selected from the group comprising:
(a) from about 5 percent to about 15 percent sodium sulfide;
(b) from about 10 percent to about 20 percent sodium hydroxide and from about 1 percent to about 10 percent hydrogen peroxide; or
(c) from about 5 percent to about 15 percent thioglycolic acid, from about 1 percent to about 5 percent calcium oxide and from about 1 percent to about 5 percent sodium hydroxide.

* * * * *